3,661,960
SYNERGISTIC METAL SEQUESTRANT
Ronald H. Carlson, Lewiston, N.Y., assignor to Hooker Chemical Corporation, Niagara Falls, N.Y.
No Drawing. Continuation-in-part of application Ser. No. 680,011, Nov. 2, 1967. This application July 13, 1970, Ser. No. 54,664
Int. Cl. C07f 15/02
U.S. Cl. 260—439 R                10 Claims

ABSTRACT OF THE DISCLOSURE

Mixtures of tris(hydroxymethyl)phosphine oxide, and tris(N,N-diacetoaminomethyl)phosphine as well as the alkali metal salts thereof, exhibit marked synergism as sequestrant compositions over a broad pH range. The sequestrant compositions are useful as additives for detergents, metal cleaning baths, peroxide compositions and dyes. The chelate products are useful in the field of agriculture for the introduction of trace elements into plant life and especially in the treatment of iron chlorosis in plants.

RELATED APPLICATIONS

This application is a continuation-in-part of Ser. No. 680,011, filed Nov. 2, 1967 now abandoned.

BACKGROUND OF THE INVENTION

The invention relates to synergistic sequestrant mixtures, their use and the chelated products thereof.

The use of complexing agents which combine with metal ions in solution to form soluble complexes (which agents are commonly referred to as sequestrants) is of great importance in many industrial processes inasmuch as it may prevent undesired precipitation reactions from occurring. For example, sequestration of calcium is important in water treatment and in laundry solutions for controlling hardness of the water. Sequestration of the heavy metals such as copper and nickel is essential in such areas as textile processing and metal cleaning and finishing. Not all sequestrants, however, are equally effective, their activity varying with their structures and the conditions under which they are used; for example, the common carboxylic acid sequestrants are often ineffective in preventing ferric ion precipitation from alkaline solutions of pH greater than 8.

The commercial utilization of water-soluble chelating compounds in agricultural applications to provide trace elements for plant growth is well known. Likewise, the treatment of plants suffering from chlorosis as a result of growth in alkaline soils devoid of sufficient assimilatable iron is known. Various chelating agents have been employed in the past to correct iron deficiencies in plants, the water solubility of chelated metal ions affords the primary route for potential assimilation into a plant structure.

Ethylenediaminetetraacetic acid (EDTA) has been employed in the past for treatment of iron deficiencies of citrus trees under acid conditions. The EDTA iron chelates are not stable in neutral and alkaline media. The development of sequestrants which may be employed in acid media as well as alkaline media is significant not only for agricultural applications, but for use in the detergent field, metal cleaning field, textile and dye industry and as stabilizers for organic and inorganic peroxides.

SUMMARY OF THE INVENTION

In accordance with the instant invention, there is provided compositions of matter comprising tris(hydroxymethyl)phosphine oxide and at least one member selected from the group consisting of tris(N,N-diametoaminomethyl)phosphine, and the alkali metal salts thereof, in mole ratio of about 25/75 to 95/5.

Furthermore, in accordance with the instant invention, there is provided a process for sequestering metal ions from aqueous solution over a pH range of about 4 to 11 by reacting the sequestrant mixture of this invention with metal ions.

Also, this invention provides novel compositions of matter comprising the sequestered metal ion derivatives of the sequestrant mixtures of this invention.

DETAILED DESCRIPTION OF THE INVENTION

Mixtures of tris(hydroxymethyl)phosphine oxide (THPO) and tris(N,N-diacetoaminomethyl)phosphine (TDAMP), and its alkali metal salts unexpectedly display marked synergistic action as a sequestrant composition in mole ratios within the range from about 25/75 to 95/5, generally at a pH of from 4 to 11.

The metal ions which may be sequestered by the composition of this invention are those cations having a valence of two or more, such as the ions of chromium, copper, nickel, tin, aluminum, cobalt, platinum, palladium, rhodium, iridium, ruthenium, osmium, zirconium, hafnium, the rare earths such as gadolinium, europium, neodymium, the actinides such as uranium, and especially iron in the ferric ($Fe^{+3}$) state.

The tris(hydroxymethyl)phosphine oxide component of the synergistic sequestrant mixture need not be introduced into an aqueous system for containing metal cations as such, because it may be formed in situ in known manner from various known precursors, such as tris(hydroxymethyl)phosphine and tetrakis(hydroxymethyl)phosphonium halide. Generally, at a pH above 7, the tetrakis(hydroxymethyl)phosphonium salts are converted to the corresponding tris(hydroxymethyl)phosphine which undergoes oxidation to produce the phosphine oxide.

The tris(N,N-diacetoaminomethyl)phosphine component of the sequestrant mixtures of this invention is preferably employed as its sodium (STDAMP) or potassium (KTDAMP) salt to increase water solubility.

The synergistic action of the sequestrant composition of this invention varies with the pH of the aqueous system as well as with the mole ratio of the components in the mixture. The sequestrant mixtures of this invention display synergistic activity towards ferric iron in the pH range from about 7–9 for mole ratio blends between about 25/75 and 95/5, at pH values up to 10 for the mole ratio blends between about 50/50 and 95/5, and at a pH value up to about 11 for the 90/10 mole ratio blend. The synergistic activity of the sequestrant mixtures is evidenced in more acid media as low as about pH 5 for mole ratios of reactants from about 25/75 to 90/10 and to about pH 4 for reactant mole ratios between about 25/75 and 50/50 and in the region of the 90/10 mole ratio.

The composition of this invention, when added to those solutions in which sequestration is desired, may be added as a solid or as a solution. If it is desired to add said composition as a solution, the composition may be dissolved in water. From about 0.001 percent to about 50 percent concentration (by weight) may be used, though it is preferred to use from about 0.01 to about 5 percent concentration (by weight), and it is even more preferred to use from about 0.1 to about 3 percent concentration (by weight).

It is preferred to use said compositions as sequestrants in aqueous solutions. When said composition is added to the solution containing metal ions to be sequestered, the temperature of said solution may be from about 0 to about 100 degrees centigrade, though it is preferred that said temperature be from about 20 to about 70 degrees centigrade, and it is even more preferred that said solution be at ambient temperature.

The sequestrant mixture of this invention may be formulated either as an aqueous solution containing the two components in the desired ratio or as a solid mixture.

The sequestered iron chelate may also be employed as an aqueous solution or as a solid. The ferric iron chelate is soluble in aqueous alkaline solution in an amount exceeding 20 percent by weight, and contains more than 10 percent iron on a weight basis. Thus, when compared to the ferric iron chelate of EDTA, which contains a relatively low percentage of iron, 5–10 percent by weight, and which exhibits low solubility in alkaline solution, the sequestrant mixture of this invention presents decided advantages.

The solid ferric ($Fe^{+3}$) iron chelates of this invention are of the general composition $$Na_n[Fe_x(THPO)_y(TDAMP)_z]$$

in which $n$, $x$, $y$ and $z$ are numbers greater than 0, and may be prepared by mixing appropriate amounts of ferric chloride, sodium hydroxide, tris(hydroxymethyl) phosphine oxide (THPO) and tris(N,N-diacetoaminomethyl)phosphine (TDAMP) or a salt thereof in aqueous solution. After the reaction is complete, the solid chelate may be forced from solution by addition of a lower alkanol, such as ethanol or isopropanol. The isolated chelate is then dried and ground into a free-flowing brown powder.

Example 1

The compound hexasodium tris(N,N-diacetatoamino-reaction of tetrakis(hydroxymethyl) phosphonium chloride (THPC) with disodium iminodiacetate (SIDA) in the following manner:

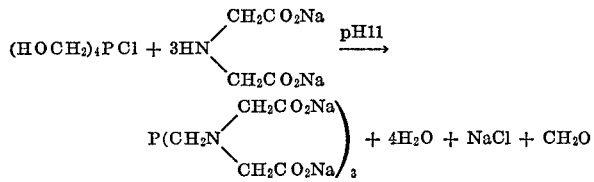

To 447 grams of aqueous solution of pH 11 containing 89.6 grams (0.459 mole) of dissolved $SIDA \cdot H_2O$ was added dropwise with stirring 61 grams of aqueous solution containing 29.92 grams (0.157 mole) of dissolved THPCH. During the addition of THPC, the pH of the reaction solution was maintained at 11 by the simultaneous addition of 6 molar aqueous NaOH. The temperature of the reaction solution increased above 5° (from 25 to 30° C.) during the addition of THPC. The yellow solution existing at the end of the THPC addition was stirred for 150 minutes to ensure complete reaction. Acetone was mixed with the aqueous reaction solution to form a two phase system (an upper organic layer and a lower aqueous, oily layer). The layers were separated by decantation and additional acetone was added to the lower layer followed by decantation, until a viscous white mass was present. This material was vacuum dried at 70° C. for 65 hours to yield a pale yellow free flowing powder. Yield: 90.0 grams (93 percent of theory).

Elemental analysis for

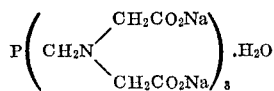

Calculated (percent): C, 29.10; N, 6.79; H, 3.26; Na, 22.30. Found (percent): C, 29.12; N, 6.75; H, 3.26; Na, 22.93.

The formation of STDAMP was further supported by infrared and nuclear magnetic resonance spectroscopic data.

Example 2

Tris(N,N-diacetoaminomethyl)phosphine (TDAMP) was prepared by treating an aqueous solution of hexasodium tris (N,N - diacetatoaminomethyl)phosphine (STDAMP) with 6 equivalents of HCl and recovering the protonated product by the same technique as is described in Example 1. The formation of TDAMP was supported by infrared and nuclear magnetic resonance spectroscopic data.

Example 3

The solid ferric iron chelate of this invention is prepared by introducing an aqueous solution of a mixture of tris(hydroxymethyl)phosphine oxide and an alkali metal salt of tris(N,N-diacetoaminomethyl)phosphine into an aqueous solution containing ferric ($Fe^{+3}$) ions. Sufficient sodium hydroxide is added to adjust the pH of the solution to near neutrality. Any solid formation is removed by decanting the solution. A lower alkanol such as ethanol or isopropanol is added to the aqueous solution to form a two-phase system. The phases are separated by decantation and the lower chelate containing phase is evaporated to dryness in vacuum at an elevated temperature such as about 0° C. After drying, the product is obtained as a free flowing yellow to brown powder readily utilizable as a source of ferric iron.

Example 4

The sequestering efficiency of the sequestrant mixtures of this invention as well as the individual sequestrants were determined by titrating an aqueous solution 0.5 molar in $FeCl_3$ dropwise into a stirred 50 gram aqueous solution containing 0.5 gram of dissolved sequestrant until the end point was reached as observed by a perceptible permanent haze in the solution. The pH of the solution of dissolved sequestrant was initially adjusted to the desired point and maintained at the specified pH during the titration by addition of aqueous sodium hydroxide as needed to control the hydrogen ion concentration.

The sequestering efficiency was then calculated in terms of the pounds of ferric ion sequestered per 100 pounds of sequestrant. A sequestering efficiency designation of 1.00 represents 7.1 pounds of ferric ion sequestered by 100 pounds of sequestrant.

The data presented in Table I compare the sequestering efficiency of tris(hydroxymethyl)phosphine oxide (THPO) and hexasodium tris(N,N-diacetoaminomethyl)phosphine and mixtures of these two sequestrants in the ratios indicated at the stated pH, for ferric ion. The mole ratio of the components of the synergistic sequestrant mixture is within the range from 25/75 to 95/5.

TABLE I

| pH | THPO | STDAMP | THPO/STDAMP | | | | |
|---|---|---|---|---|---|---|---|
| | | | 25/75 | 50/50 | 80/20 | 90/10 | 95/5 |
| 4 | 0.4 | 1.3 | 1.4 | 2.3 | 1.2 | 2.1 | 0.8 |
| 5 | 0.3 | 1.2 | 2.4 | 5.4 | 1.6 | 2.5 | 0.9 |
| 6 | 0.2 | 1.7 | 3.6 | 4.9 | 2.3 | 4.5 | 1.1 |
| 7 | 0.2 | 1.9 | 3.8 | 4.6 | 7.5 | 6.0 | 2.1 |
| 8 | 0.1 | 1.7 | 3.5 | 4.7 | 7.6 | 7.2 | 2.5 |
| 9 | 0.4 | 1.6 | 2.2 | 5.8 | 7.5 | 7.9 | 3.7 |
| 10 | 3.6 | 1.6 | 2.7 | 3.7 | 7.5 | 4.3 | 6.0 |
| 11 | 10.1 | 0.9 | 2.3 | 4.0 | 8.3 | 13.0 | 5.9 |
| 12 | 19.7 | 0.4 | 2.8 | 1.1 | 8.6 | 13.8 | 2.8 |

It is clear from the data presented in Table I that mixtures of tris(hydroxymethyl)phosphine oxide and hexasodium tris(N,N-diacetatoaminomethyl) phosphine exhibit synergistic activity in the sequestration of the ferric ion at those pH values from about 7–9 for mole ratio mixtures between about 25/75 and 95/5, at pH values up to 10 for the mole ratio blends between about 50/50 and 95/5, and at a pH value up to about 11 for the 90/10 mole ratio blend. Furthermore, the data evidences synergistic activity in acid media as low as about pH 5 for the reactant mole ratios from about 25/75 to 90/10 and as low as pH 4 for reactant mole ratios between about 25/75 and 50/50 and in the region of the 90/10 mole ratio blend.

To further place the instant invention in perspective, the sequestering efficiencies of several known sequestrants for the ferric ion are presented in Table II. The abbreviations employed are as follows:

Disodium iminodiacetate—SIDA
Trisodium nitrilotriacetate—SNTA
Sodium tripolyphosphate—STPP
Tetrasodium ethylene-diaminetetraacetate—SEDTA
Gluconic acid
Trisodium hydroxyethyl-ethylenediaminetriacetate—SHEDTA
Pentasodium nitrilotrimethylene phosphonate—SNTMP
Pentasodium diethylene-triaminepentaacetate—SDTPA

TABLE II

| Sequestrant | Sequestering efficiency | | | | | | | | |
|---|---|---|---|---|---|---|---|---|---|
| | pH 4 | pH 5 | pH 6 | pH 7 | pH 8 | pH 9 | pH 10 | pH 11 | pH 12 |
| SIDA | 0.7 | 0.6 | 0.5 | 0.7 | 1.0 | 1.0 | 1.0 | 0.5 | 0.2 |
| SNTA | 3.2 | 2.1 | 1.4 | 1.1 | 1.0 | 0.8 | 0.7 | 0.3 | 0.1 |
| STPP | 1.7 | 1.0 | 0.9 | 0.6 | 1.2 | 1.5 | 1.2 | 0.6 | 0.2 |
| SEDTA | 1.0 | 1.8 | 1.1 | 0.9 | 1.4 | 1.3 | 1.0 | 0.5 | 0.1 |
| Gluconic acid | | | | 6.0 | 6.6 | 6.7 | 6.8 | 4.5 | 3.2 |
| SHEDTA | | 2.2 | | 2.2 | 2.6 | 2.6 | 2.4 | 1.5 | 0.8 |
| SNTMP | | | | | | | 2.0 | 1.9 | 1.0 |
| SDTPA | | | | 1.3 | 1.3 | 1.6 | 1.9 | 0.9 | 0.5 |

From a comparison of the sequestering efficiencies of the known sequestrants presented in Table II, with the synergistic sequestrant mixture THPO/STDAMP presented in Table I, it is apparent that the mixed sequestrant of the instant invention provides completely unexpected activity toward the ferric ion.

What is claimed is:

1. A composition of matter comprising tris(hydroxymethyl) phosphine oxide and a second member selected from the group consisting of tris(N,N-diacetoaminomethyl) phosphine and an alkali metal salt thereof, in mole ratio of about 25/75 to 95/5.

2. A composition of claim 1 in which the mole ratio of tris(hydroxymethyl) phosphine oxides to said second member is from about 50/50 to 95/5.

3. A composition of claim 1 in which the mole ratio of tris(hydroxymethyl)phosphine oxide to said second member is from about 25/75 to 90/10.

4. A composition of claim 1 in which the mole ratio of tris(hydroxymethyl)phosphine oxide to said second member is from about 25/75 to 50/50.

5. A composition of claim 1 in which the mole ratio of tris(hydroxymethyl)phosphine oxide to said second member is about 90/10.

6. A method for sequestering ferric ions in aqueous solution which comprises reacting said ferric ions at a pH from about 4–11 with a composition of claim 1.

7. A method for sequestering ferric ions in aqueous solution which comprises reacting said ferric ions at a pH from about 5–7 with the composition of claim 3.

8. A method for sequestering ferric ions in aqueous solution which comprises reacting said ferric ions at a pH from about 7–10 with the composition of claim 2.

9. A chelated ferric ion complex product resulting from the process of claim 6.

10. An iron chelate compound prepared by reacting a mixture of tris(hydroxymethyl)phosphine oxide and a member selected from the group consisting of tris(N,N-diacetoaminomethyl)phosphine and the alkali metal salts thereof in mole ratio of about 25/75 to 95/5 with ferric ions in aqueous solution at a pH from about 4–11, and thereafter recovering said iron chelate as a solid product.

References Cited
UNITED STATES PATENTS 3,304,330  2/1967  Yoke et al. ......... 260—606.5
3,477,953  11/1967  Carlson ............ 252—175

TOBIAS E. LEVOW, Primary Examiner

A. P. DEMERS, Assistant Examiner

U.S. Cl. X.R.

71—79, 97; 252—132, 137, 152, 175, Digest 11, Digest 17; 260—429 J, 429.1, 429.2, 606.5 P,

PO-1050
(5/69)

UNITED STATES PATENT OFFICE
CERTIFICATE OF CORRECTION

Patent No. 3,661,960      Dated May 9, 1972

Inventor(s) Ronald H. Carlson

It is certified that error appears in the above-identified patent and that said Letters Patent are hereby corrected as shown below:

Column 2, line 1, "diametoamino-" should read ---diacetoamino---
Column 3, line 32, after amino- insert ---methyl) phosphine (STDAMP) was prepared by the---; line 52, "5°" should read ---5°C---.

Signed and sealed this 7th day of November 1972.

(SEAL)
Attest:

EDWARD M. FLETCHER, JR.
Attesting Officer

ROBERT GOTTSCHALK
Commissioner of Patents